J. LE PAGE.
CUTTING ROLLS.
APPLICATION FILED OCT. 28, 1914.
1,183,573.
Patented May 16, 1916.
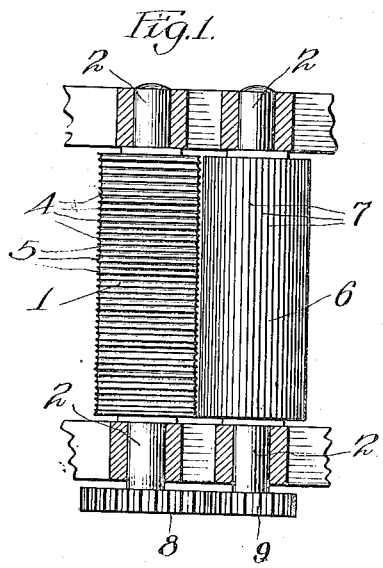
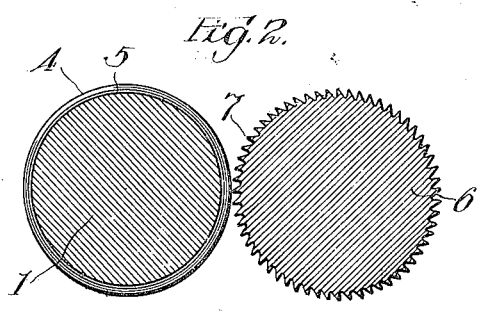
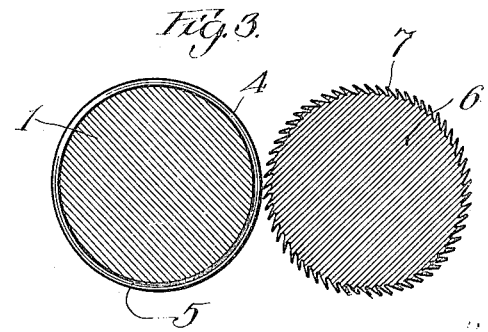
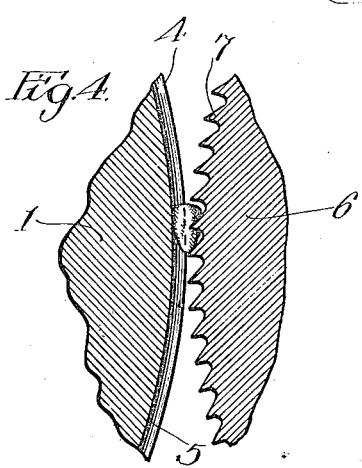
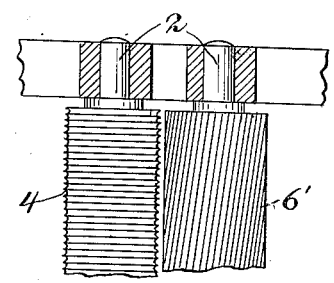
Witnesses:
Leo J. Dumais.
Arthur B. Framke.
Inventor.
Jules LePage
by Clarence K. Chamberlain
Atty.

UNITED STATES PATENT OFFICE.

JULES LE PAGE, OF DARLINGTON, INDIANA.

CUTTING-ROLLS.

1,183,573.  Specification of Letters Patent.  Patented May 16, 1916.

Application filed October 28, 1914. Serial No. 868,969.

*To all whom it may concern:*

Be it known that I, JULES LE PAGE, a citizen of the United States, residing at Darlington, in the county of Montgomery and State of Indiana, have invented certain new and useful Improvements in Cutting-Rolls, of which the following is a specification.

My invention relates to machinery which is used for comminuting the kernels or berries of cereals, coffee and the like, when it is desired to reduce the same to small particles or fragments as distinguished from flour or meal. For many purposes and as applied to various grains or berries, this is highly desirable. Coffee is much better when reduced to the distinctly granular form. This is also true of cereals when converted into certain kinds of breakfast food, and it is found a great advantage and economy to feed grain, such as corn, to poultry and livestock when the kernels are cut into granules of as nearly possible uniform size. While there is a constantly increasing demand for this class of products, the machinery at present in use for the purpose of preparing it requires several operations and produces a large amount of material which, with reference to the object to be attained is to be considered inferior or a by-product. When passed through such machinery a certain portion of the grain is reduced to the proper degree of fineness, while another portion is too fine, and is separated, only to be sold or used as a meal at a comparatively low price. Another and considerable portion comes through such machinery in too coarse form and then requires further treatment for its reduction to the desired size. In this further process, however, additional portions are crushed and reduced to the condition of meal and bran and have to be added to the by-product. What has been stated concerning the operation of such machinery now in use for the preparation of cereals in general is true of coffee, rice, corn, wheat or any other similar product which is best used in the form of finely cut berries for alimentary purposes, such as some kinds of breakfast food preparations, and also for the making of alcohol. It is further to be noted that the machines now in use are elaborate and expensive, involving the use of a plurality of pairs of rolls with the necessary gearing and supporting mechanism to insure their proper relative operation.

It is the object of my invention to provide means by which a single pair of rolls co-acting in proper relation will accomplish the desiderata above recited without the defects or objections which attach to former methods of this class of machine construction and operation.

My improved rolls are so constructed and related that the grains passing through them are reduced to a granular form of standard and practically uniform size, with the minimum amount of fine material or by-product. I do this by producing a distinct cutting action of the rollers as distinguished from any grinding or crushing action. This method of operation of said rolls greatly reduces the amount of power required to drive them, while their comparatively limited number and the simplicity of the mechanism required to operate them effect a further power economy. Furthermore, by this construction they clear themselves in the regular course of their operation.

The principles of my invention are illustrated in the drawings, in which—

Figure 1 shows a top view of a pair of rolls made in accordance with the principles of my invention; Fig. 2 is a cross section thereof on the line 2—2 of Fig. 1; Fig. 3 is a similar cross section showing a modification of my device; Fig. 4 is an enlarged representation of a portion of two facing rolls to illustrate the action thereof; Fig. 5 shows a top plan view of a part of a pair of rolls with the high speed roll having its corrugations or knife edges somewhat inclined to the longitudinal axis of the roll.

Further describing my invention with reference to the drawings: 1 is a roll of the general type or description ordinarily used in roller mills, having end bearings 2 and 3, and provided with a multiplicity of substantially annular knives or cutting edges 4 separated from each other by grooves 5, the bottom of said grooves being rounded so as to be U-shaped in cross section. On the roll 6 the corrugations are extended longitudinally on the circumference thereof. They may be parallel to its longitudinal axis as in Fig. 1 or somewhat inclined from end to end forming a slight spiral as shown for the roll 6' in Fig. 5. Said corrugations have sharp or knife shaped edges 7 and project forwardly in the direction of the rotation of the said roll. As shown in Fig. 2 the forward face of said corrugations may be substantially in the radial line of the roll or, as shown in Fig. 3, the said corrugations may be undercut so as to be still further forwardly projecting. In either case the bottom of the grooves separating the said corrugations from each other should be rounded from end to end. I consider this very important, as this form of groove, both in the roll with longitudinal corrugations and that with the circumferential corrugations, clears itself more freely, and without crushing the grain, than though a different shaped separating groove were used, as for instance one of V-shape.

The two rolls are connected with gears 8 and 9, so that they will travel at different rates of speed. As indicated in the drawing, I prefer to have the longitudinally corrugated roll travel at the high speed. As illustrated in Fig. 4 by a single kernel of corn, shown with reference to the action of one corrugation on each roll, distinct cuts are made at the intersection of such corrugations from the opposite sides of the grain. Of course not all the grain passing through my device will be presented centrally at the crossing of two blades, but a comparatively large proportion will be substantially so presented. When the knife on the slow acting roll presses against a grain on one side, a corresponding knife on the fast roll seizes and cuts it transversely. At the same time the kernel is carried forward between the two rolls with a drawing cut against the first named corrugation. Transverse cuts are thus made in the opposite sides of the kernel which, by the further action of the rolls will be broken to finish the cut. This is effectively accomplished by the fact that that part of the kernel below the transverse cut will be drawn downwardly by the action of the fast roll, while the portion of the kernel above the cut is relatively retarded by the frictional contact with the slow moving roll. The separation will thus be complete to form a granular product of substantially uniform size and character.

I have found that U-shaped grooves between the corrugations are effective in causing the rolls to clear themselves of the material operated on. The material which is forced into the corrugations is less compacted in this form of groove. On the slow roll, this tendency to clear is supplemented by the action of the fast roll which constantly gives a forward movement to such material relatively to said slow roll. And in practice I prefer to give the corrugations on the fast roll a slight spiral. Material in the grooves will thereby be given an impulse lengthwise of said grooves by the relative action of the other roll and the material between the rolls.

Having thus fully described my invention what I claim as new and desire to secure by Letters Patent is:—

1. In cutting rolls, the combination of a roll having substantially annular cutting corrugations, with a roll having longitudinal cutting corrugations separated from each other by grooves rounded at the bottom.

2. In cutting rolls, the combination of a roll having substantially annular cutting corrugations separated from each other by grooves rounded at the bottom, with a roll having longitudinal cutting corrugations forwardly inclined in the direction of their rotation and separated from each other by grooves rounded at the bottom.

3. In cutting rolls, the combination of a roll having substantially annular cutting corrugations separated from each other by grooves rounded at the bottom, with a roll having longitudinal cutting corrugations undercut in the direction of their rotation and separated from each other by grooves rounded at the bottom.

4. In cutting rolls, the combination of a roll having substantially annular cutting corrugations separated from each other by grooves rounded at the bottom, with a roll having longitudinal corrugations forwardly inclined in the direction of their rotation and separated from each other by grooves rounded at the bottom, and means for causing the last named roll to rotate at a greater speed than the roll first named.

5. In cutting rolls, the combination of a roll having substantially annular cutting corrugations separated from each other by grooves rounded at the bottom, with a roll having longitudinal and slightly spiral cutting corrugations forwardly inclined in the direction of their rotation and separated from each other by grooves rounded at the bottom.

6. In cutting rolls, the combination of a roll having substantially annular cutting corrugations separated from each other by grooves rounded at the bottom, with a roll having longitudinal and slightly spiral cutting corrugations forwardly inclined in the direction of their rotation and separated from each other by grooves rounded at the bottom, and means for causing the last named roll to rotate at a greater speed than the roll first named.

7. In cutting rolls, the combination of a roll having substantially annular cutting corrugations, with a roll having longitudinal cutting corrugations separated from each other by grooves rounded at the bottom, and means for driving the last-named roll at a greater speed than the roll first named.

8. A mechanism for making granular cereal products comprising a plurality of coacting non-contacting rolls having peripheral knives or sharp corrugations separated from each other by rounded grooves substantially equal in width and depth, the cutting edges or knives on the two rolls at their points of nearest approach being in different planes.

9. A mechanism for making granular cereal products comprising a plurality of coacting non-contacting rolls having peripheral knives or sharp corrugations separated from each other by rounded grooves substantially equal in width and depth, the cutting edges or knives on the two rolls at their points of nearest approach being in planes approximating a right angle to each other.

10. The method of reducing cereals to granular form which consists in simultaneously making cuts in opposite sides of the kernels, and applying relative movement to the cut parts to cause said kernels to be fractured in completion of said cuts.

11. The method of reducing cereals to granular form which consists in simultaneously making cuts in opposite sides of the kernels, applying relative movement to the cut parts to cause said kernels to be fractured in completion of said cuts, and simultaneously maintaining the cut parts uncrushed while being separated from each other.

12. The method of reducing cereals to granular form, which consists in making cuts in the kernels and applying relative movement to the cut parts to cause said kernels to be fractured in completion of said cuts.

13. The method of reducing cereals to granular form, which consists in making cuts in the kernels, applying relative movement to the cut parts to cause said kernels to be fractured in completion of said cuts, and maintaining the cut parts uncrushed while being separated from each other.

In witness whereof, I have hereunto subscribed my name this 19th day of October, 1914, in the presence of two subscribing witnesses.

JULES LE PAGE.

Witnesses:
C. K. CHAMBERLAIN,
A. S. PHILLIPS.